US008886553B2

(12) United States Patent
Greef et al.

(10) Patent No.: US 8,886,553 B2
(45) Date of Patent: Nov. 11, 2014

(54) VISUAL WORKFLOW PROCESS NOTATION AND LAYOUT

(75) Inventors: Arthur R. Greef, Rungsted Kyst (DK); Jens Olesen Lund, Slangerup (DK); Christian Hagel-Sorensen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 2180 days.

(21) Appl. No.: 11/415,834

(22) Filed: May 2, 2006

(65) Prior Publication Data

US 2007/0260499 A1 Nov. 8, 2007

(51) Int. Cl.
| | | |
|---|---|---|
| *G06Q 10/00* | (2012.01) | |
| *G05B 19/409* | (2006.01) | |
| *G06Q 10/10* | (2012.01) | |
| *H04L 29/08* | (2006.01) | |
| *G06Q 10/06* | (2012.01) | |

(52) U.S. Cl.
CPC ............ *G05B 19/409* (2013.01); *G06Q 10/103* (2013.01); *H04L 67/36* (2013.01); *G06Q 10/0639* (2013.01); *G06Q 10/06313* (2013.01); *G05B 2219/31449* (2013.01); *G06Q 10/06* (2013.01); *G06Q 10/06316* (2013.01); *G06Q 10/0633* (2013.01); *G06Q 10/06393* (2013.01)
USPC ....... 705/7.39; 705/7.38; 705/7.27; 705/7.23; 705/7.11

(58) Field of Classification Search
CPC ................................................. G06Q 10/0639
See application file for complete search history.

(56) References Cited

U.S. PATENT DOCUMENTS

| | | | | |
|---|---|---|---|---|
| 5,524,077 A | * | 6/1996 | Faaland et al. | 705/7.21 |
| 5,586,021 A | * | 12/1996 | Fargher et al. | 700/100 |
| 5,826,239 A | * | 10/1998 | Du et al. | 705/7.26 |
| 5,835,898 A | * | 11/1998 | Borg et al. | 705/7.12 |
| 5,999,911 A | * | 12/1999 | Berg et al. | 705/7.26 |
| 6,003,011 A | * | 12/1999 | Sarin et al. | 705/7.26 |
| 6,023,702 A | * | 2/2000 | Leisten et al. | 1/1 |
| 6,041,306 A | * | 3/2000 | Du et al. | 705/7.26 |
| 6,065,009 A | * | 5/2000 | Leymann et al. | 1/1 |
| 6,092,048 A | * | 7/2000 | Nakaoka | 705/7.15 |
| 6,243,696 B1 | * | 6/2001 | Keeler et al. | 706/21 |
| 6,256,651 B1 | * | 7/2001 | Tuli | 715/224 |

(Continued)

OTHER PUBLICATIONS

Wackerow D, Adam W and Burton D (2001). MQSeries Workflow for Windows NY for Beginners. IBM Redbooks. Mar. 2001. pp. 1-164.*

(Continued)

*Primary Examiner* — Brett Feeney
(74) *Attorney, Agent, or Firm* — Damon Rieth; Brian Haslam; Micky Minhas

(57) ABSTRACT

In a method of a technology for visual workflow process notation and layout, a workflow process graphical user interface is generated. A plurality of activity nodes is arranged along a workflow path, with each activity node representing a work activity. The activity nodes are arranged on the workflow path in representation of an order of performance of work activities within the process of performing work. A material flow path is arranged adjacent to the workflow path. The material flow path is representative of a flow of a material through the work activities associated with the plurality of activity nodes. A resource allocation node is disposed adjacent to a portion of the material flow path and one of said activity nodes. The resource allocation node represents a resource utilized in performing a work activity, represented by the adjacent activity node, upon a material represented by the portion of the material flow path.

16 Claims, 9 Drawing Sheets

(56) References Cited

U.S. PATENT DOCUMENTS

| | | | |
|---|---|---|---|
| 6,278,901 B1* | 8/2001 | Winner et al. | 700/99 |
| 6,279,009 B1* | 8/2001 | Smirnov et al. | 1/1 |
| 6,336,053 B1* | 1/2002 | Beatty | 700/108 |
| 6,397,191 B1* | 5/2002 | Notani et al. | 705/7.26 |
| 6,434,440 B1* | 8/2002 | Teranishi et al. | 700/97 |
| 6,775,647 B1* | 8/2004 | Evans et al. | 703/7 |
| 6,795,071 B2* | 9/2004 | Tracey et al. | 345/440 |
| 6,798,413 B1* | 9/2004 | Tracey et al. | 345/440 |
| 6,834,370 B1* | 12/2004 | Brandl et al. | 715/201 |
| 6,975,914 B2* | 12/2005 | DeRemer et al. | 700/96 |
| 6,976,033 B2* | 12/2005 | Yang et al. | 1/1 |
| 7,100,147 B2* | 8/2006 | Miller et al. | 717/102 |
| 7,242,991 B2* | 7/2007 | Budinger et al. | 700/95 |
| 7,302,401 B1* | 11/2007 | Tervonen | 705/7.17 |
| 7,349,864 B2* | 3/2008 | Ohsaki | 705/7.26 |
| 7,428,724 B2* | 9/2008 | Pike et al. | 717/105 |
| 7,496,860 B2* | 2/2009 | Saxena et al. | 715/853 |
| 7,577,554 B2* | 8/2009 | Lystad et al. | 703/2 |
| 7,801,689 B2* | 9/2010 | Roy et al. | 702/27 |
| 8,433,601 B2* | 4/2013 | Ohsaki | 705/7.27 |
| 2002/0055849 A1 | 5/2002 | Georgakopoulos et al. | 705/1 |
| 2002/0078432 A1* | 6/2002 | Charisius et al. | 717/102 |
| 2003/0004767 A1* | 1/2003 | Ohsaki | 705/7 |
| 2003/0014314 A1* | 1/2003 | Griep et al. | 705/15 |
| 2003/0033191 A1* | 2/2003 | Davies et al. | 705/10 |
| 2003/0195646 A1* | 10/2003 | Yang et al. | 700/96 |
| 2003/0217053 A1* | 11/2003 | Bachman et al. | 707/4 |
| 2003/0217054 A1* | 11/2003 | Bachman et al. | 707/4 |
| 2003/0220707 A1* | 11/2003 | Budinger et al. | 700/97 |
| 2003/0225462 A1* | 12/2003 | Bachman et al. | 700/1 |
| 2003/0225469 A1* | 12/2003 | DeRemer et al. | 700/96 |
| 2004/0002950 A1* | 1/2004 | Brennan et al. | 707/1 |
| 2004/0015821 A1* | 1/2004 | Lu et al. | 717/103 |
| 2004/0078373 A1* | 4/2004 | Ghoneimy et al. | 707/10 |
| 2004/0148047 A1* | 7/2004 | Dismukes et al. | 700/100 |
| 2005/0040223 A1* | 2/2005 | Yigit et al. | 235/376 |
| 2006/0005157 A1* | 1/2006 | Saxena et al. | 717/101 |
| 2006/0031840 A1* | 2/2006 | Yigit et al. | 718/102 |
| 2006/0080616 A1* | 4/2006 | Vogel et al. | 715/769 |
| 2006/0190231 A1* | 8/2006 | Malloy et al. | 703/14 |
| 2006/0235557 A1* | 10/2006 | Knight et al. | 700/103 |
| 2007/0076228 A1* | 4/2007 | Apelbaum et al. | 358/1.1 |
| 2007/0208603 A1* | 9/2007 | Ohsaki | 705/8 |
| 2012/0290350 A1* | 11/2012 | Ohsaki | 705/7.13 |

OTHER PUBLICATIONS

Arena User's Guide. Rockwell Software. Rockwell Automation. Oct. 2005. 1-150.*

* cited by examiner

300

ARRANGING A PLURALITY OF ACTIVITY NODES ALONG A WORKFLOW PATH.
310

↓

ARRANGING A MATERIAL FLOW PATH ADJACENT TO THE WORK FLOW PATH.
320

↓

DISPOSING A RESOURCE ALLOCATION NODE ADJACENT TO A PORTION OF THE MATERIAL FLOW PATH AND ONE OF THE ACTIVITY NODES.
330

↓

DISPLAYING A LEGEND.
340

↓

DISPLAYING A MESSAGE BOX NEAR ONE OF THE PLURALITY OF ACTIVITY NODES.
350

↓

EXHIBITING A TREND BAR ADJACENT TO ONE OF THE PLURALITY OF ACTIVITY NODES.
360

ARRANGING A PLURALITY OF ACTIVITY NODES ALONG A WORKFLOW PATH ASSOCIATED WITH A MATERIAL USED IN A PRODUCT.
710

↓

DISPLAYING A TEXTUAL LABEL ADJACENT TO ONE OF THE ACTIVITY NODES.
720

↓

EXHIBITING A SUMMARIZED GRAPHICAL PERFORMANCE METRIC ADJACENT TO ONE OF THE PLURALITY OF ACTIVITY NODES.
730

FIG. 7

VISUAL WORKFLOW PROCESS NOTATION AND LAYOUT

BACKGROUND

In business management environments, especially in production and manufacturing processes, many tools are used to represent the activities involved in the processes that are used to perform a task or to create a product. These tools give managers insight into information, such as: details of individual activities, materials consumed, time spent, costs involved, products created, and a variety of other data necessary to understand, manage and improve the processes.

In a manufacturing process, such as, for example, a bicycle building process, it is desirable to represent the process used to build a product. To do this, two data structures are typically used. The first data structure is a Bill of Materials (BOM). The second data structure is a Routing. Both data structures are typically stored electronically, but can also be displayed in printed form.

The BOM data structure represents the component parts and end products that will be produced or used at steps in the production process. A BOM structure may take the form of a table, but is typically shown as a tree-shaped list. A BOM tree fans out from a top level product to show component and sub-component parts that the top level product is comprised of. For instance, with a top level product of a bicycle, example component parts shown as branches might be frames and seats. Sub-components shown as additional branches stemming from a frame component branch might be types of steel pipe. While sub-components shown as additional branches stemming from a seat component branch might be leather and foam padding. In some instances, a single BOM tree may be used to describe a bill of materials for an entire production process, such as the process of making bicycles. In other instances, many separate BOMs may be used to show bills of material for raw materials and component parts that are used in production of an end product, such as a bicycle.

The routing data structure describes or traces a path that that each part and end product will take through a production facility, such as between work stations and inventory locations. If multiple production sites or factories are involved in a production process, the routing will also trace part and product paths between production sites. Routing structures can be displayed as trees, but are more typically displayed as tables of rows and columns similar to those of a spread sheet. Routing structures contain information describing the activities performed on the parts listed in the BOM, such as: labor, machine time, or scheduling information related to a particular activity. A product routing may be described in a single routing data structure, or many smaller routing data structures.

BOM and routing structures are typically used by managers to plan logistics, costs, and production schedules for a manufacturing process. For instance, if a market exists for 1000 bicycles, a manager can determine, through analysis of these structures, where and when to produce the components of these bicycles so that the correct number of end products can be manufactured. Further analysis of these data structures can help a manufacturer determine how much a product will cost to produce, and where the costs are generated.

A third data structure type, called a process flow diagram, also exists. The process flow diagram visually displays steps in a process. Examples of such process flow diagrams include flow charts, Gant charts, and Pert charts. However process flow diagrams currently in use contain very little, if any, information used by managers. These process flow diagrams are instead typically used by process engineers and production schedulers to visually represent, design, and operate a process, rather than by managers who manage the process.

These separate data structures are useful, but have many drawbacks. For instance, it is very difficult to see all parts of a process at once, as the components and activities are represented in at least two, and sometimes many more separate data structures. Further, even if all parts can be seen at once it can be challenging to visualize a process flow from data tables and tree structures. Another drawback is that different disciples such as managing and engineering rely on different structures to describe the same process. Further, because different data structures exist, it is hard to correlate the information during planning. It is also difficult to keep the information in sync when the process is running. These difficulties in correlating and syncing data can lead to mistakes which negatively impact cost, schedule, and performance of a process. It is also very difficult to improve a process when it cannot be visualized in its entirety.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A technology for visual workflow process notation and layout is disclosed. The technology represents elements and activities of workflow processes with a notation comprised of visually distinct symbols. In one method approach, a workflow process graphical user interface (GUI) is generated and displayed by a system that lays out portions of a workflow process using the visual workflow process notation. Activity nodes are arranged along a workflow path, with each activity node representing a work activity that is performed in the workflow process that the GUI is being generated for. The activity nodes are arranged on the workflow path in representation of the order of performance of work activities within the workflow process. In some embodiments, textual labels are added to portions of the graphical user interface. In some embodiments, graphical and/or textual performance metrics are also added to portions of the GUI that is displayed.

A material flow path is then optionally arranged adjacent to the workflow path. The material flow path is representative of a flow of a material through the work activities associated with the plurality of activity nodes. A resource allocation node is then optionally disposed adjacent to a portion of the material flow path and one of the activity nodes. The resource allocation node symbolizes a resource utilized in performing a work activity, represented by the adjacent activity node, upon a material represented by the adjacent portion of the material flow path. A plurality of resource allocation nodes may be used, as required to illustrate the workflow process.

DESCRIPTION OF THE DRAWINGS

The accompanying drawings, which are incorporated in and form a part of this specification, illustrate embodiments of the technology for visual workflow process notation and layout and, together with the description, serve to explain principles discussed below:

FIG. 3 is a flow diagram of operations performed in accordance with one embodiment of the present technology for visual workflow process notation and layout.

FIG. 7 is a flow diagram of operations performed in accordance with one embodiment of the present technology for visual workflow process notation and layout.

The drawings referred to in this description should be understood as not being drawn to scale except if specifically noted.

DETAILED DESCRIPTION

Reference will now be made in detail to embodiments of the present technology for identifying design issues in electronic forms, examples of which are illustrated in the accompanying drawings. While the technology for visual workflow process notation and layout will be described in conjunction with various embodiments, it will be understood that they are not intended to limit the present technology for visual workflow process notation and layout to these embodiments. On the contrary, the presented technology for visual workflow process notation and layout is intended to cover alternatives, modifications and equivalents, which may be included within the spirit and scope the various embodiments as defined by the appended claims. Furthermore, in the following detailed description, numerous specific details are set forth in order to provide a thorough understanding of the present technology for visual workflow process notation and layout. However, the present technology for visual workflow process notation and layout may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "arranging", "disposing", "displaying", "exhibiting", "configuring", "selecting", "populating", "utilizing", "rendering", "denoting", "extending", "combining", "generating", and "receiving", or the like, refer to the actions and processes of a computer system (such as computer 100 of FIG. 1), or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for visual workflow process notation and layout is also well suited to the use of other computer systems such as, for example, optical, virtual, and mechanical computers. Additionally, it should be understood that in embodiments of the present technology for visual workflow process notation and layout, one or more of the steps can be performed manually.

Example Computer System Environment

Figure 1:
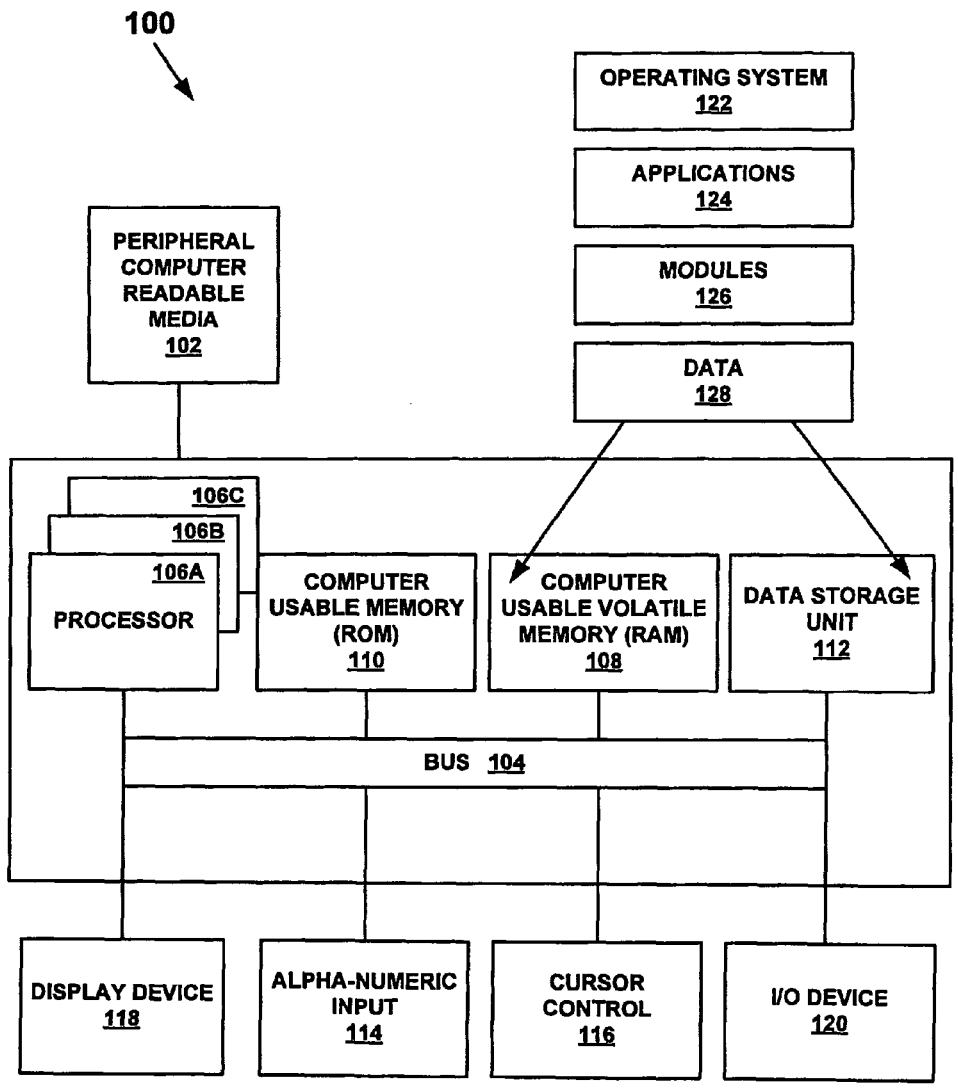
FIG. 1 is a diagram of an exemplary computer system used in accordance with embodiments of the present technology for visual workflow process notation and layout.

With reference now to FIG. 1, portions of the technology for visual workflow process notation and layout are composed of computer-readable and computer-executable instructions that reside, for example, in computer-usable media of a computer system. That is, FIG. 1 illustrates one example of a type of computer that can be used to implement embodiments, which are discussed below, of the present technology for visual workflow process notation and layout. FIG. 1 illustrates an exemplary computer system 100 used in accordance with embodiments of the present technology for visual workflow process notation and layout. It is appreciated that system 100 of FIG. 1 is exemplary only and that the present technology for visual workflow process notation and layout can operate on or within a number of different computer systems including general purpose networked computer systems, embedded computer systems, routers, switches, server devices, client devices, various intermediate devices/nodes, stand alone computer systems, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C. System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 of FIG. 1, may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands. System 100 is also well suited to having a cursor directed by other means such as, for example, voice commands. System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present technology for visual workflow process notation and layout, for example, is stored as an application 124 or module 126 in memory locations within RAM 108 and memory areas within data storage unit 112

Exemplary System for Generating Visual Workflow Process Notations and Layouts

Figure 2:
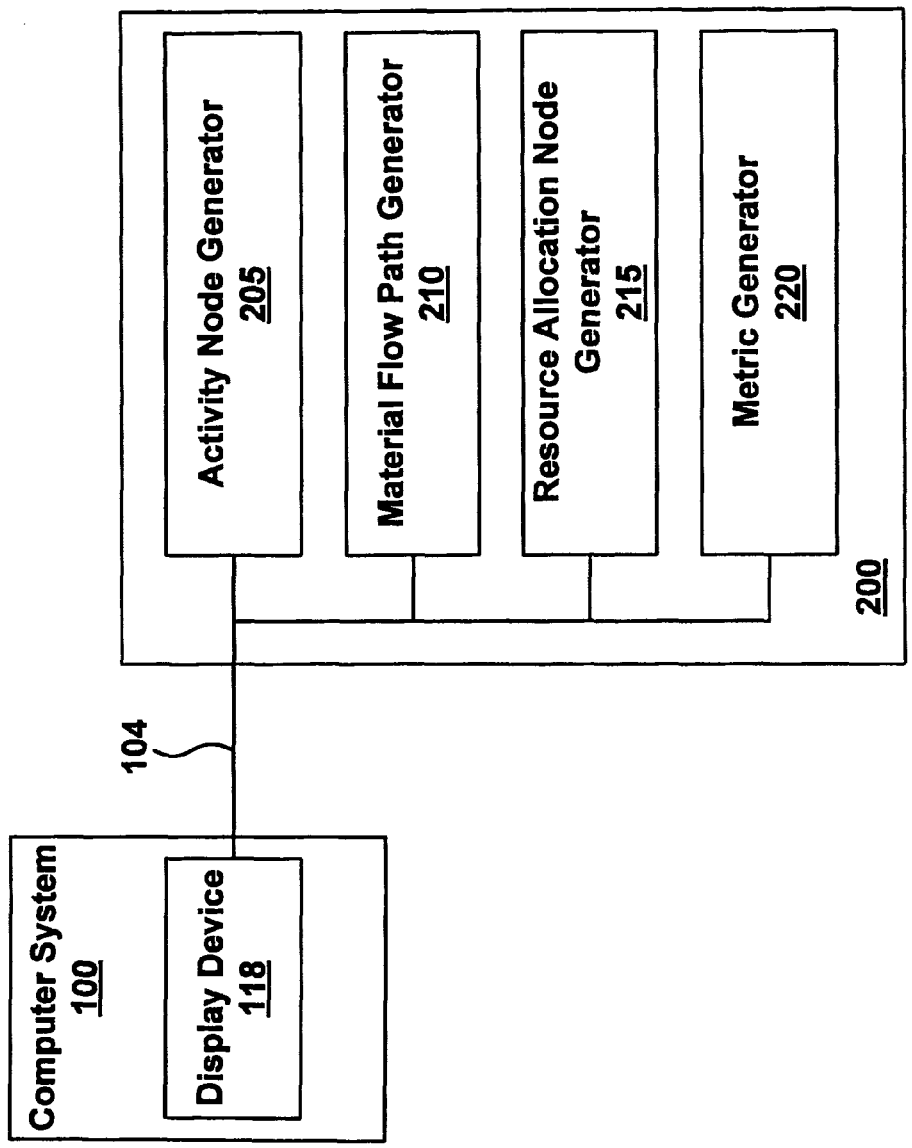
FIG. 2 is a diagram of one embodiment of a system for visual workflow process notation and layout.

FIG. 2 shows a block diagram of components of an exemplary system 200 which generates visual workflow process notations and layouts, according to one embodiment of the present technology. The following discussion will begin with a description of the physical structure of system 200. Discussion will turn to description of components of system 200 used in an exemplary method for generating a workflow process graphical user interface. An exemplary notation and layout created using the exemplary method will be described Discussion will proceed to a description of components of system 200 used in an exemplary method for displaying a unified visual representation of a workflow process on a display device in a computer system. An exemplary unified visual representation generated using the exemplary method will be described.

Physical Structure

With respect to the physical structure, system 200 is comprised of an activity node generator 205, a material flow path generator 210, a resource allocation node generator 215, and a metric generator 220 which are all coupled to one another and configure to couple to a common input/output bus such as bus 104 (FIG. 1). In one embodiment of the present technology, system 200 is also configured to couple, for example via bus 104, to computer system 100 and display device 118 (both of FIG. 1). In another embodiment of the present technology, not illustrated, system 200 takes the form of an application 124 (FIG. 1) that is resident on portions of computer system 100. System 200 is configured to generate elements of a workflow process layout for visual display on a display device, such as display device 118.

Exemplary Methods of Operation

The following discussion sets forth in detail the operation of present technology for visual workflow process notation and layout. With reference to FIGS. 3 and 7, flow diagrams 300 and 700 each illustrate exemplary steps used by various embodiments of the present technology for visual workflow process notation and layout. Flow diagrams 300 and 700 include processes that, in various embodiments, are carried out by a processor under the control of computer-readable and computer-executable instructions. The computer-readable and computer-executable instructions reside, for example, in data storage features such as computer usable volatile memory 108, computer usable non-volatile memory 110, and/or data storage unit 112 of FIG. 1. The computer-readable and computer-executable instructions are used to control or operate in conjunction with, for example, processor 106A and/or processors 106A, 106B, and 106C of FIG. 1. Although specific steps are disclosed in flow diagrams 300 and 700, such steps are exemplary. That is, embodiments are well suited to performing various other steps or variations of the steps recited in flow diagrams 300 and 700. It is appreciated that the steps in flow diagrams 300 and 700 may be performed in an order different than presented, and that not all of the steps in flow diagrams 300 and 700 may be performed.

Generating a Workflow Process Graphical User Interface

FIG. 3 is a flow diagram 300 of operations performed in accordance with one embodiment of the present technology for visual workflow process notation and layout. More specifically, FIG. 3 illustrates a flow diagram 300 of an exemplary embodiment of a method for generating a workflow process graphical user interface. Elements of system 200 and flow diagram 300 are explained below, in conjunction with workflow layout 500 of FIG. 5 and visual notation legend 400 of FIG. 4.

Figure 5:
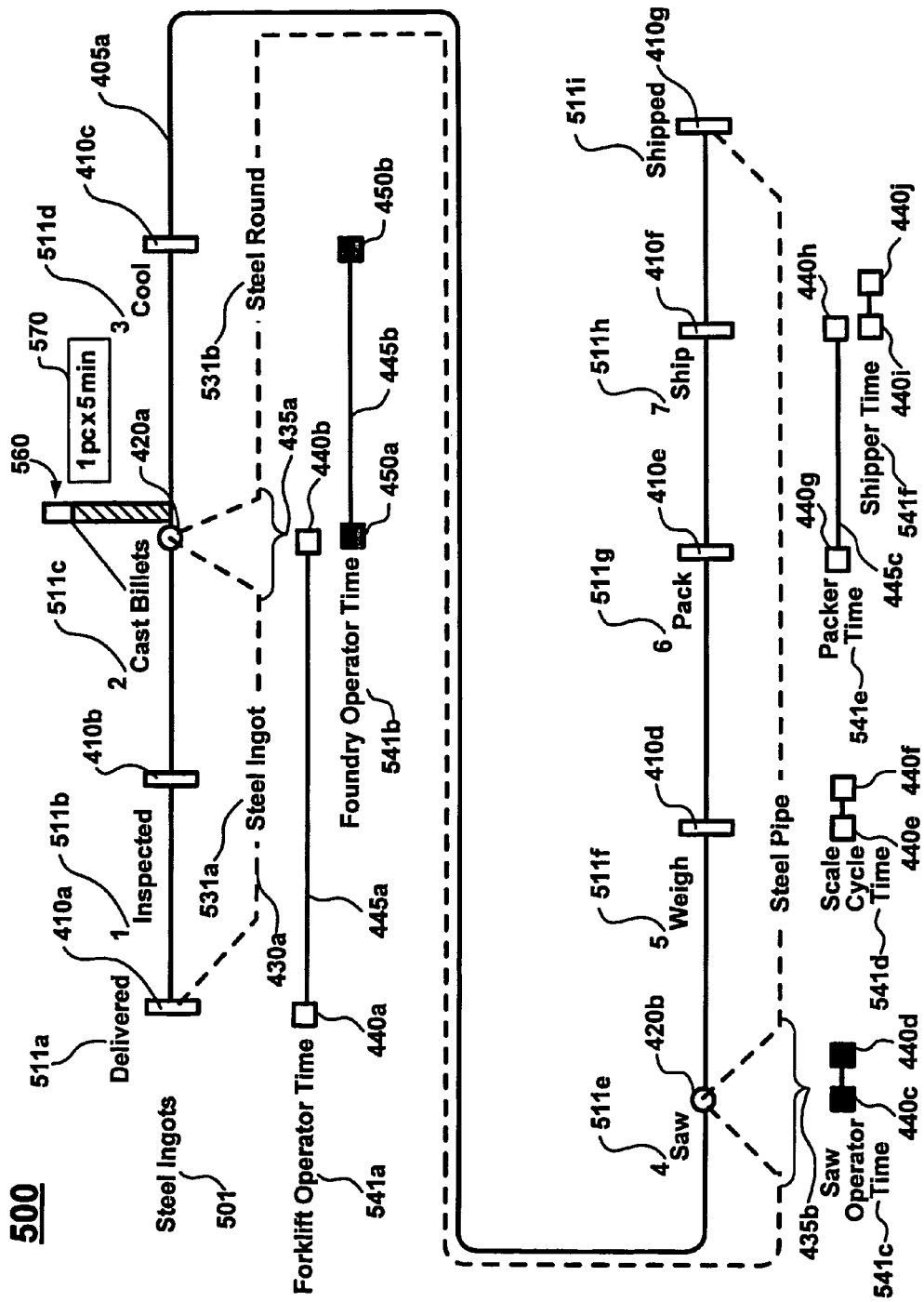
FIG. 5 is a representation of an exemplary visual workflow process layout generated in accordance with one embodiment of the present technology for visual workflow process notation and layout.

FIG. 5 represents an exemplary visual workflow process layout 500 generated in accordance with one embodiment of the present technology for visual workflow process notation and layout. For example, in one embodiment, visual workflow process layout 500 represents a workflow process graphical user interface generated and displayed by method 300 and system 200 of the present technology. In the displayed embodiment, workflow process 500 is "read" from upper left to lower right, and is a workflow process for making steel pipe from the raw material of steel ingots. In other embodiments of the present technology, workflow process 500 is arranged and read in the direction that matches cultural reading and writing conventions. For example right to left and from top to bottom is the reading and writing convention in some cultures. System 200 is used to generate all visual symbols and textual labels in workflow process layout 500. For instance, starting label 501 is generated by system 200. Other labels and symbols in visual layout 500 are described below, in conjunction with applicable portions of system 200 or flow diagram 300.

At step 310 of flow diagram 300, in one embodiment, activity node generator 205, of the present technology for visual workflow process notation and layout, arranges a plurality of activity nodes along a workflow path. Activity node generator 205 is configured to generate activity nodes and a workflow path for display on a display device, such as display device 118. In one embodiment, the activity nodes and workflow path are generated and displayed as part of a graphical user interface of a workflow process or a unified visual representation of a workflow process. Each activity node represents an individual work activity or event that occurs in a process of performing work, such as, for example, in a manufacturing process. Activity node generator 205 then arranges the activity nodes along the workflow path in representation of an order of performing work within the process that is being visually represented.

Activity node generator 205 receives information for generating activity nodes via: manual user inputs (such as through computer system 100 or some similar input method); via information retrieval from files or data structures such as electronically stored Pert charts, Gant charts, routing structures, or BOM structures; or via some combination of manual input and retrieval from stored electronic information.

Activity node generator 205 generates activity nodes to represent both value added and non-value added work activities and events. Value added work activities and events are those that increase the value of a product, for instance by transforming a raw material into a different form. Non-value added activities or events are those that do not increase the value of a product. Some examples of a non-value added activities are events such as moving a component from one place to another place in a warehouse or transporting a component from one station to another station in a manufacturing line.

In one embodiment of the present technology, activity node generator 205 generates separate visual symbols to represent value added and non-value added activity nodes. Value added activity node symbol 420 and non-value added activity node symbol 410, both of FIG. 4, exemplify an embodiment of separate visual symbols used to represent value added and non-value added activity nodes. In some embodiments, other visual symbols are also generated for sub-classifications of value added and non-value added activities and/or for other classifications of activities.

In one embodiment of the present technology, activity node generator 205 arranges activity nodes along a workflow path by populating a first end of the workflow path with an initial activity node, such as non-value added activity node 410a of FIG. 5. The initial activity node represents a first work activity or event in a process of production, manufacturing, or some other type of work. Activity node generator 205 populates a second end of the workflow path with a terminal activity node, such as non-value added activity node 410g of FIG. 5. The terminal activity node represents a final work activity or event in the process of production, manufacturing, or some other type of work. Activity node generator 205 populates the work flow path with activity nodes associated with intermediate work activities. Non-value added activity nodes 410b, 410c, 410d, 410e, and 410f, and value added activity nodes 420a and 420b, all of FIG. 5, are examples of intermediate activity nodes. Activity node generator 205 arranges these intermediate activity nodes in sequential order of occurrence along the workflow path between the initial activity node and the terminal activity node of the workflow process.

In one embodiment, activity node generator 205 renders a textual label adjacent to one of more of the activity nodes. The textual label describes the work activity or event that the activity node represents. Activity node label 511a of FIG. 5, "Delivered", is an example of such a label. In one embodiment, the textual label also comprises a step number to denote its place in a sequential order of performance of the activities in the represented workflow process. Activity node label 511b of FIG. 5, "[1]Inspected", is an example of such a label. Activity node label 511b represents the first activity performed in a workflow process. Labels 511c, 511d, 511e, 511f, 511g, 511h, and 511i are other examples of activity node labels shown in FIG. 5.

Activity node generator 205, of the present technology, uses a unique visual notation to represent a workflow path. Element 405 of FIG. 4, a thick line, represents one embodiment of a visual notation for a workflow path. Workflow path 405a of FIG. 5 shows an example of this notation in use. In some embodiments, the visual notation for a work flow path can comprise lines similar to element 405 that are configured in a variety of colors, shadings, or visual textures to represent distinct workflow paths or distinct portions of a workflow path.

Figure 8:
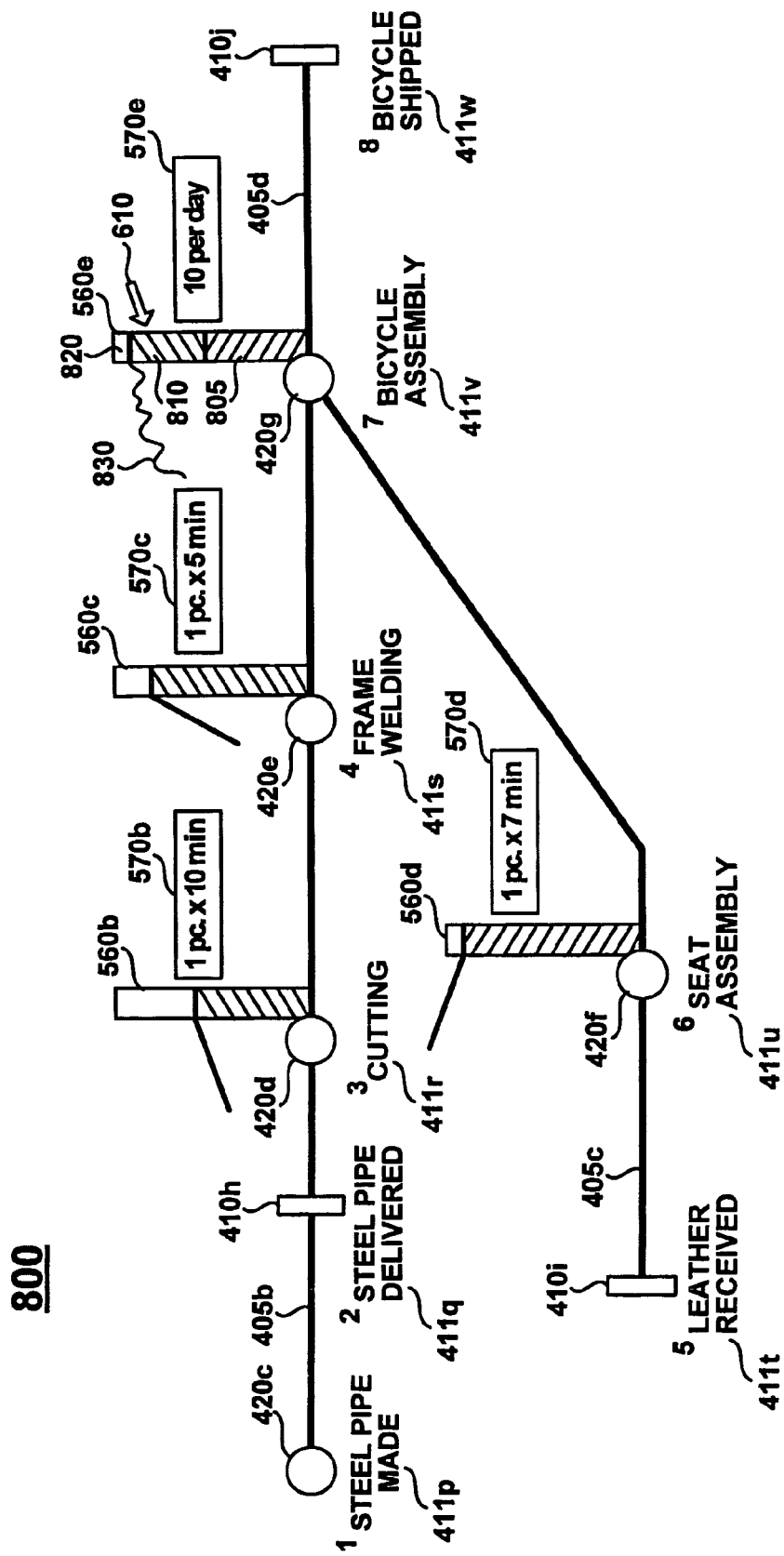
FIG. 8 is a representation of an exemplary visual workflow process layout generated in accordance with one embodiment of the present technology for visual workflow process notation and layout.

In one embodiment, activity node generator 205 automatically scales and arranges the workflow path that is generated, such that an end-to-end overview of a workflow process is displayed in aggregate on a single screen of a display device. This is useful, for example, so that a manager can get a quick overview of the activities and other information associated with a workflow process. FIG. 8 represents such an example of such an end-to-end overview. In one embodiment, one or more selectable portions of a displayed workflow process layout are configured to display in an enlarged fashion in response to a user selection. This allows the selectable portions to display more detailed process information when enlarged. It also reduces the visual complexity a top-level workflow process graphical user interface. Value added activity node 420c, "[1]Steel Pipe Made", of FIG. 8 represents a selectable portion that can be enlarged. For example, in response to a user selection of activity node 420c, workflow process 500 of FIG. 5 is displayed to show an enlarged, more detailed workflow process diagram of the process for making steel pipe from ingots of steel.

At step 320 of flow diagram 300, in one embodiment, material flow path generator 210, of the present technology for visual workflow process notation and layout, arranges a material flow path for display adjacent to the workflow path generated by activity node generator 205. In one embodiment, the material flow path generator is configured to generate a material flow path for display adjacent to the workflow path on a display device such as display device 118 (FIG. 1). In one embodiment, the material flow path is generated as part of a workflow process graphical user interface or a unified visual representation of a workflow process that is being displayed. In some embodiments where multiple materials are used in a workflow process, material flow path generator 210 generates a material flow path to represent the flow of each of the materials used in the process.

Material flow path generator 210 receives information for generating a material flow path via: manual user inputs (such as through computer system 100 or some similar input method); via information retrieval from files or data structures such as electronically stored Pert charts, Gant charts, routing structures, or BOM structures; or via some combination of manual input and retrieval from stored electronic information.

Material flow path generator 210 uses a unique visual notation to represent a flow of material, such as a raw material or transformed intermediate material, through the various work activities associated with the plurality of activity nodes generated by activity node generator 205. Dashed line 430 of FIG. 4, and dashed line 430a of FIG. 5, each exemplify an embodiment of a unique visual symbol that is used in one embodiment of the present technology to represent a material flow path.

In one embodiment, material flow path generator 210 also uses a unique visual notation to represent transformations of a material. These transformations are, for example, transformations that take place due to value added activities that are performed on a material. Element 435, of FIG. 4, (a notch shaped dashed line) exemplifies one embodiment of a unique visual notation that is used in one embodiment of the present technology to denote a transformation of a material on a material flow path. Using such visual notations, material flow path generator 210 denotes transformation points on the material flow path to represent transformational stages. An example of a transformational stage, is a transformative step in the process of creating a finished product from a raw material. For example, in FIG. 5, transformation point 435a, indicates where the activity of casting billets, represented by 420a, transforms steel ingot material into steel round. Similarly, transformation point 435b indicates where the activity of sawing, represented by 420b, transforms the material of steel round into steel pipe.

In one embodiment, material flow path generator 210 also associates textual labels with a material flow path, such as, for example, by inserting one or more textual labels into the material flow path. Material flow path label 531a of FIG. 5, "Steel Ingot", is exemplary of one embodiment of such a textual label. Such labels give a quick visual indication of what material is represented by a flow path. In one embodiment, such labels are modified after material transformations occur on a material flow path. Material flow path label 531b of FIG. 5, "Steel Round", is an example of a label that has been modified following a transformation, indicated by 435a, which occurred in a material flow path 430a. Material flow path label 531c, "Steel Pipe", is another such label that shows a modification to a material following a transformation, indicated by 435b, which occurred in material flow path 430a.

At step 330 of flow diagram 300, in one embodiment, resource allocation node generator 215, of the present technology for visual workflow process notation and layout, disposes a resource allocation node adjacent to a portion of one of the activity nodes and/or the material flow path. Resource allocation node generator is configured to generate resource allocation nodes for display on a display device, such as display device 118 (FIG. 1). The resource allocation node represents a resource utilized in performing a work activity represented by the adjacent activity node upon the material represented by the adjacent portion of the material flow path. In one embodiment, a resource allocation node is generated for display adjacent to the workflow path and/or material flow path displayed on a display device, for example, as part of a graphical user interface or as part of a unified visual representation of a workflow process. In an embodiment where multiple resources are allocated to perform an activity represented by an activity node, resource allocation node generator 215 generates multiple resource allocation nodes for display adjacent to the activity node.

Resource allocation node generator 215 receives information for generating resource allocation nodes via: manual user inputs (such as through computer system 100 or some similar input method); via information retrieval from files or data structures such as electronically stored Pert charts, Gant charts, routing structures, or BOM structures; or via some combination of manual input and retrieval from stored electronic information.

Resource allocation node generator 215 uses a unique visual notation to represent application of resources, such as: human labor, machine labor, or other such resources to perform an activity in a workflow process. Element 440, of FIG. 4, (two white square boxes connected by a line segment) exemplifies a unique visual symbol that is used in one embodiment of the present technology to represent a resource allocation node. Viewing element 440 from left to right, the first box represents the starting point of the resource allocation, the line segment represents a period of application of the resource, and the second box represents the end of the resource allocation. In one embodiment, resource allocation node generator 215 identifies allocation of bottleneck resources with a unique visual notation. Element 450 of FIG. 4, (two shaded square boxes connected by a line segment) exemplifies a unique visual symbol that is used, in one embodiment of the present technology, to represent allocation of a bottleneck or constrained resource.

In one embodiment, resource allocation node generator 215 uses a unique visual notation to represent a resource utilization path of resources that are used for a longer period of time, such as a period of time that spans multiple activities represented by multiple activity nodes. Element 445, of FIG. 4, (a line segment) exemplifies a unique visual symbol that is used in one embodiment of the present technology to represent a resource allocated over a period of time or allocated in association with more than one activity. For example, in one embodiment, a longer line segment extended between the start point and end point boxes of element 440 or 450 represents a longer resource allocation time, while a shorter line segment represents a shorter resource allocation time. Thus, a resource allocation path that spans multiple activity nodes is visually indicative of a resource utilized in conjunction with a plurality of work activities associated with the activity nodes that are encompassed by the lengthwise span of the resource utilization path and the start and end points of the resource allocation node.

Referring to FIG. 5, resource allocation nodes 440a, 440b, and resource utilization path 445a, are exemplary of such a resource utilization path that spans multiple activity nodes. Resource allocation nodes 440g, 440h, and resource allocation path 445c are another such example. Resource allocation nodes 450a, 450b, and resource utilization path 445b, are exemplary of a bottleneck resource utilization path that spans multiple activity nodes. Resource allocation nodes 440c-440d (bottleneck resource), and 440e-440f, and 440i-440j are examples of resource allocations that do not span multiple activity nodes.

In one embodiment, resource allocation node generator 215 also associates a textual label with a resource allocation node, such as, for example, by displaying a textual label adjacent to the resource allocation node. Resource allocation node label 541a of FIG. 5, "Forklift Operator Time", is exemplary of one embodiment of such a textual label displayed adjacent to resource allocation node 440a. Resource allocation node labels 541b, 541c, 541d, 541e, and 541f, are other examples of textual labels. Such resource allocation node labels give a quick visual indication of what resource is represented by a resource allocation node.

Figure 4:
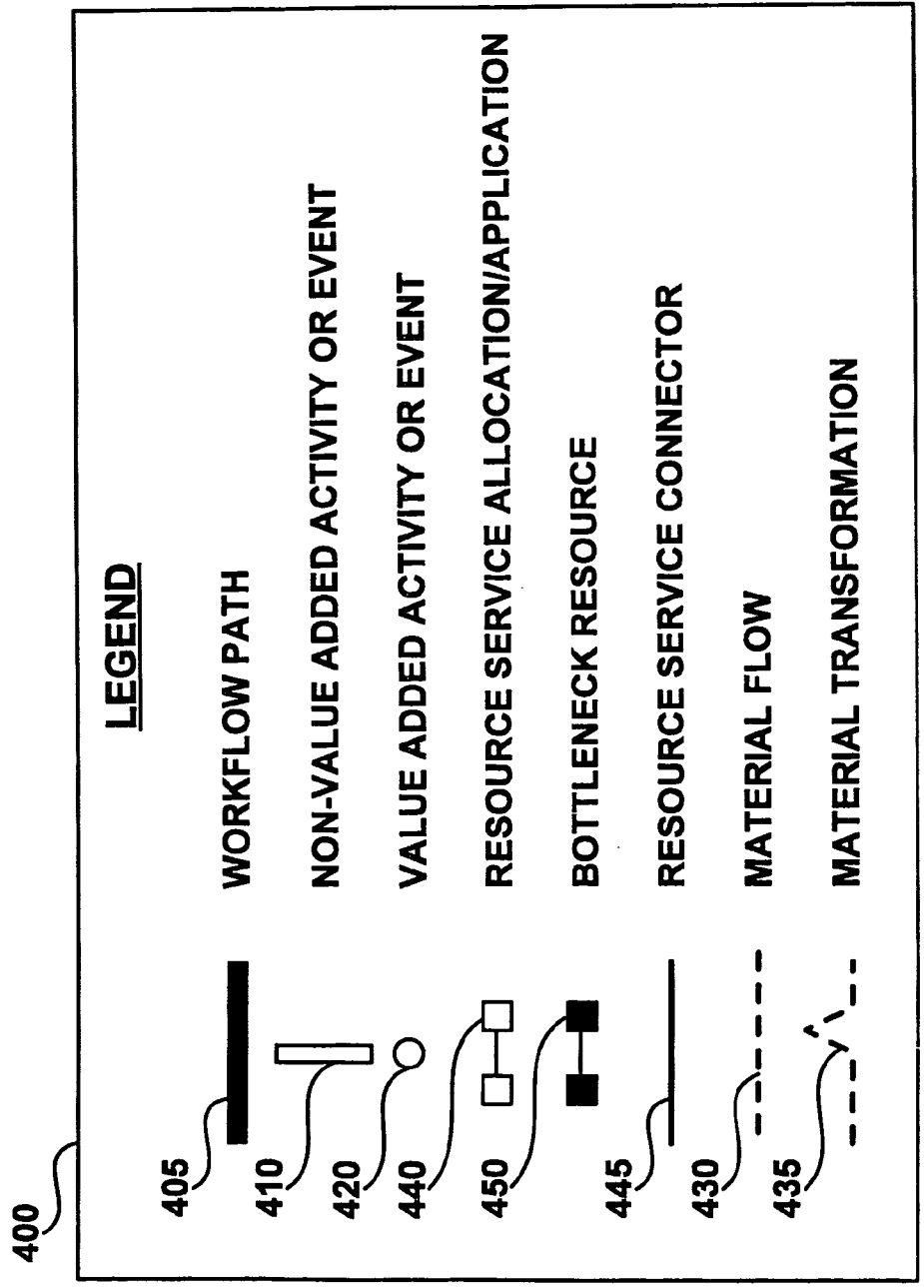
FIG. 4 is a representation of an exemplary visual workflow process notation generated in accordance with one embodiment of the present technology for visual workflow process notation and layout.

At step 340 of flow diagram 300, in one embodiment, system 200, of the present technology for visual workflow process notation and layout, generates a legend. System 200 generates the legend for display on a display device, for instance, in conjunction with or separately from the display of a workflow process. The legend that is generated and displayed explains the visual notations and representations used to portray elements of the workflow process, such as in a workflow process graphical user interface or in a unified visual representation of a workflow process. Legend 400 of FIG. 4 is an example of a legend generated by an embodiment of the present technology. Legend 400 is comprised of visual notation elements 405, 410, 420, 430, 435, 440, 445, and 450 (all previously described). Each visual notation element (405, 410, 420, 430, 435, 440, 445, and 450) is presented in conjunction with a label that describes what the visual notation element is used for. For example the label "Workflow Path" is presented in conjunction with element 405, which is the visual notation element for a workflow path.

At step 350 of flow diagram 300, in one embodiment, metric generator 215, of the present technology for visual workflow process notation and layout, displays a message near an activity node. Metric generator 215 is configured to generate and display metrics on a display device, such as display device 118 (FIG. 1). In one embodiment the metric is generated for display as part of a graphical user interface or as part of a unified visual representation of a workflow process. The message box conveys textual information related to performance metric of the activity node. In one embodiment, the message box conveys information related to a time for performing a work activity associated with the activity node that the message box is displayed near. For example, in some embodiments, a time displayed in a message box is a measured time for actually completing the activity, such as a piece of work, associated with the activity node. While in other embodiments, the time displayed is the time allocated by a manager for completion of an activity associated with an activity node. Message box 570 of FIG. 5 is an example of such a message box. Message box 570 indicates that one piece of steel round is being created in five minutes of time, by the activity associated with activity node 420a.

Metric generator 220 receives source information for generating performance metrics via: manual user inputs (such as through computer system 100 or some similar input method); via information retrieval from files or data structures such as electronically stored Pert charts, Gant charts, routing structures, or BOM structures; via measurements or samplings of actual performance of work activities, or via some combination of these sources.

Metric generator 215 uses the received source information, which is related to performance of work activities in a workflow process, to generate a metric or metrics for display adjacent to an activity node associated with the work activity. In some embodiments, this performance metric takes the form of a text box, as was described in conjunction with step 350 of FIG. 3. In other embodiments, this performance metric takes the form of a graphical representation of data, such as a trend bar, pie graph, histogram, or other graphical representation of data.

At step 360 of flow diagram 300, in one embodiment, metric generator 215, of the present technology for visual workflow process notation and layout, exhibits a trend bar adjacent to an activity node. The trend bar provides a summarized graphical performance metric of a work activity that is associated with an activity node. Trend bar 560 of FIG. 5 is an example of such a trend bar. Trend bar 560 presents a summarized visual display of two related metrics, such as present throughput efficiency of a work activity and the historical trend of that throughput over a period of time. The functioning of trend bar 560 is additionally described in conjunction with FIGS. 6A and 6B. In one embodiment, selecting trend bar 560 (or any other metric displayed near an activity node), for instance with a cursor device, causes trend bar 560 to display a more detailed version of the summarized graphical performance metric that was displayed prior to the selection. In one embodiment, selecting a metric, such as a trend bar, displayed near an activity node, causes the source data for the metric to be displayed for viewing, and in some embodiments, user manipulation and/or alteration.

Figure 6A:
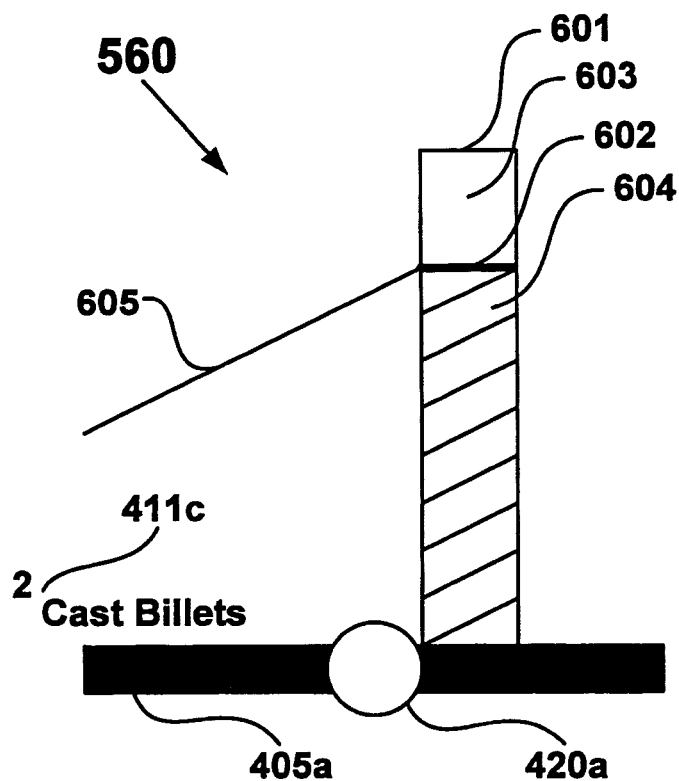
FIG. 6A is a representation of an exemplary metric generated in accordance with one embodiment of the present technology for visual workflow process notation and layout.

FIG. 6A shows an enlarged view of trend bar 560. Trend bar 560 is exhibited on workflow path 405a. Trend bar 560 is associated with and disposed adjacent to activity node 420a. Activity node 420a represents the activity of casting billets, as represented by activity node label 411c, "Cast Billets". In FIG. 6A, trend bar 560 displays a summarized performance metric for the billet casting activity with utilization bar 601 and trend line 605. Utilization bar 601 is divided into two sections, 603 and 604, by a present level of utilization indicator line 602. Shaded region 604 represents a percentage of performance, such as capacity, which is being attained by the billet casting activity of node 420a. Unshaded region 603 represents a percentage of performance, such as capacity, which is unattained by the billet casting activity of node 420a.

Figure 6B:
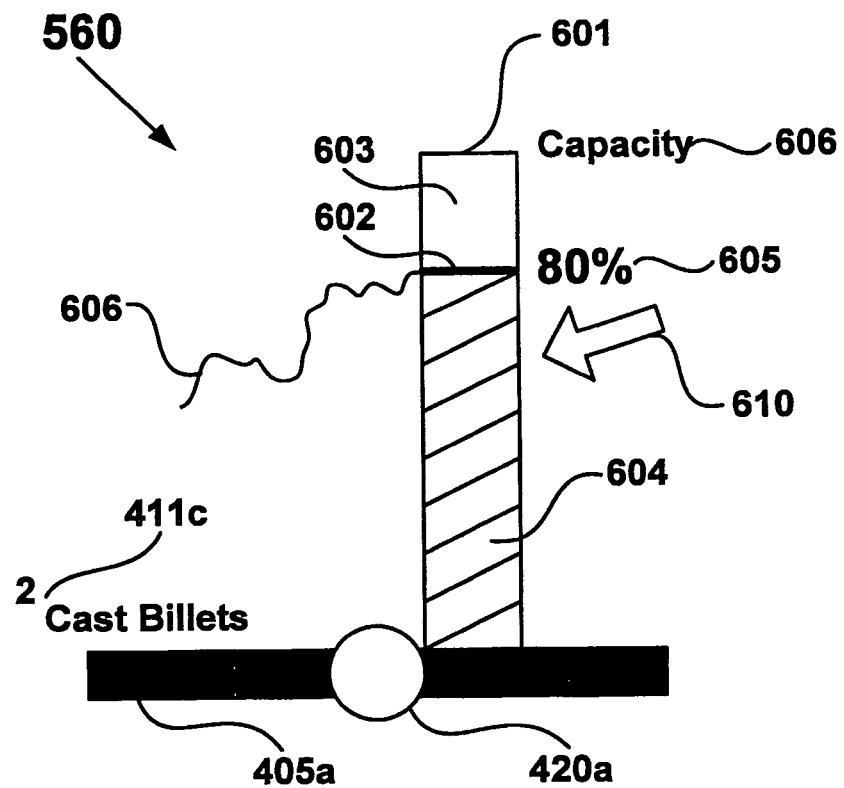
FIG. 6B is a representation of an exemplary metric generated in accordance with one embodiment of the present technology for visual workflow process notation and layout.

FIG. 6B also shows trend bar 560 exhibited on workflow path 405a. Trend bar 560 is still associated with and disposed adjacent to activity node 420a. However, in FIG. 6B, trend bar 560 uses utilization bar 601 and trend line 605 to display a more detailed representation of the summarized performance metric displayed in FIG. 6A. This more detailed view is shown in response to a user selection of trend bar 560, such as, for example, with cursor 610. In FIG. 6B, as in FIG. 6A, utilization bar 601 is divided into two sections, 603 and 604, by a present level of utilization indicator line 602. Shaded region 604 still represents a percentage of performance, such as capacity, which is being attained by the billet casting activity of node 420a. Unshaded region 603 still represents a percentage of performance, such as capacity, which is unattained by the billet casting activity of node 420a. However, trend line 605 now shows a detailed trend graph of changing data over some pre-specified period of time. In addition, in one embodiment, labels, such as labels 605 and 606, are added to show more detail about the metric being displayed.

Displaying a Unified Visual Representation of a Workflow Process

FIG. 7 is a flow diagram 700 of operations performed in accordance with one embodiment of the present technology for visual workflow process notation and layout. More specifically, FIG. 7 illustrates a flow diagram 700 of an exemplary embodiment of a method for displaying a unified visual representation of a workflow process on a display device. Elements of flow diagram 700 are described below in conjunction with reference to portions of system 200 of FIG. 2, flow diagram 300 of FIG. 3, and workflow process layout 800 of FIG. 8.

FIG. 8 represents an exemplary visual workflow process layout 800 generated in accordance with one embodiment of the present technology for visual workflow process notation and layout. For example, in one embodiment, visual workflow process layout 800 represents a unified workflow process generated and displayed on a display device by method 700 and system 200 of the present technology. Workflow process 800 is "read" from left to right, and is a workflow process for making bicycles from the raw materials of steel pipe and leather. System 200 is used to generate all visual symbols and textual labels in workflow process layout 800. Much of the visual notation, comprised of labels and symbols, has been previously described in conjunction with workflow layout 500 of FIG. 5 and flow diagram 300 of FIG. 3. In the interests of clarity and to avoid redundancy, reference is made to these previous descriptions, where possible.

At step 710 of flow diagram 700, activity node generator 205 of the present technology for visual workflow process notation and layout arranges a plurality of activity nodes along a workflow path associated with a material used in an end product. In one such embodiment, the displayed workflow path comprises an end-to-end overview of an entire workflow process configured for aggregate display on a single screen of a display device. Each displayed activity node, such as node 420c or node 410h represents an individual work activity within a process of performing work, such as a manufacturing process used to produce a product. In one embodiment, user selection of some portion of the displayed unified visual representation of the workflow process causes a more detailed view of that portion of the workflow process to be displayed. For example, in response to a user selection of activity node 420c (steel pipe made) of FIG. 8, workflow process 500, which shows a detailed process of making steel pipe, is displayed.

Much of the functionality of activity node generator 205 was previously described in conjunction with step 310 of flow diagram 300. In step 710, activity node generator 205 operates in the previously described fashion to arrange a plurality of activity nodes, such as value added activity nodes 420c, 420d, 420e, and 420g, and non-value added activity node 410h, along a material flow path, such as material flow path 405b. Additionally, activity node generator 205 arranges non-value added activity node 410i and value added activity nodes 420f and 420g along material flow path 405c. Finally, activity node generator 205 also arranges value added activity node 420g and non-value added activity node 410j along a combined material flow path 405d.

In one embodiment, as shown in FIG. 8, arranging a plurality of activity nodes along a workflow path associated with material used in a product comprises combining a plurality of workflow paths to illustrate a production process. For example, workflow path 405b is associated with steel pipe being welded into frames and assembled into bicycles, while workflow path 405c is associated with leather being assembled into seats that are then assembled into bicycles. These workflow paths are combined and merge into workflow path 405d to show a bicycle production process. In some embodiments of the present technology, separate workflow paths are shown in a distinct fashion, such as in different colors, so that they may be easily visually differentiated.

In step 720 of FIG. 7, activity node generator 205 of the present technology for visual workflow process notation and layout displays a textual label adjacent to one or more of the of the activity nodes that have been arranged along a workflow path. Each displayed activity node, such as node 420c or node 410h, represents an individual work activity within a process of performing work to produce a product. For example, in layout 800, value added activity 420c represents steel pipe being made in the process of producing bicycles.

This is evident, because activity node generator 205 has rendered textual activity node label 411p, "Steel Pipe Made" adjacent to activity node 420c. Activity node generator 205 has also generated labels 411q, 411r, 411s, 411t, 411u, 411v, and 411w, which provide descriptions of the individual work activities represented by the activity nodes they are respectively displayed adjacent to. Each of the activity nodes, in FIG. 8 is arranged on workflow paths 405b, 405c, and 405d in representation of the order of performance of the work activities within the illustrated workflow process of performing work to produce and ship bicycles.

At step 730 of flow diagram 700, metric generator 220 of the present technology for visual workflow process notation and layout exhibits a summarized graphic performance metric adjacent to one or more of the activity nodes arrayed along workflow paths 405b, 405c, and 405d of FIG. 8. Much of the functionality metric generator 220 was previously described in conjunction with steps 350 and 360 of flow diagram 300. Metric generator 220 operates in this previously described fashion to exhibit summarized textual and/or graphical performance metrics. Each displayed performance metric provides information regarding the performance of the work activity represented by the particular activity node that the metric is displayed adjacent to.

For example in FIG. 8, metric generator 220 has generated graphical performance metrics 560b, 560c, 560d, and 560e, and textual performance metrics 570b, 570c, 570d, and 570e.

These performance metrics display visual summaries of the performance of an activity. For example, trend bar 560b, represents a summarized metric of the performance of activity of cutting (411r) that is represented by activity node 420d. Likewise, text message metric 570b represents a summarized metric of the performance of activity of cutting (411r) that is represented by activity node 420d.

In one embodiment of the present technology, the displayed performance metrics, such as the graphical performance metrics, are configured to display a more detailed version of the summarized graphic performance metric in response to a user selection. Trend bar 560e, which is displayed adjacent to activity node 420g is an example of a more detailed graphical performance metric that is displayed in response to a user selection, such as with cursor 610. As shown in FIG. 8, trend bar 560e shows a utilization bar with two shaded regions 805 and 810, an unshaded region 820, and a trend graph 830. Shaded region 805 displays a percentage of performance related to workflow path 405c. Shaded region 810 shows percentage of performance related to workflow path 405b. Unshaded region 820 shows remaining capability, such as unattained performance capacity. Trend graph 830 shows a detailed graph of performance data over a pre-specified period of time.

In one embodiment of the present technology, a displayed performance metric, such as summarized graphical performance metric is configured to display source data that is used to create the summarized graphical performance metric. In one such embodiment, for example, the present technology displays the source data for trend bar 560e in response to an additional selection via cursor 610. The displayed source data can then be viewed and/or edited by a user.

Exemplary embodiments and advantages of the present technology for visual workflow process notation and layout is thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method for generating a workflow process graphical user interface, said method comprising:

arranging by a processor a plurality of activity nodes along a workflow path on said workflow process graphical user interface, wherein each said activity node represents an individual work activity within a process of performing work, and wherein said activity nodes are arranged on said workflow path in representation of an order of performance of work activities within said process of performing work;

arranging a material flow path adjacent to said workflow path on said workflow process graphical user interface, said material flow path representative of a flow of different materials through said work activities associated with said plurality of activity nodes;

disposing a resource allocation node adjacent to a portion of said material flow path and two or more of said activity nodes on said workflow process graphical user interface, wherein said disposing comprises extending a resource utilization path between a start point of said resource allocation node and an end point of said resource allocation node, said resource allocation node representative of a resource utilized in performing a plurality of work activities upon a material represented by said portion of said material flow path, wherein said plurality of work activities are associated with activity nodes encompassed by a lengthwise span of said resource utilization path and said start and end points and wherein a first visual indicator is used to denote the start and end points of a resource allocation node and a second visual indicator is used to denote the start and end points of a bottlenecked source; and displaying a message box near one of said plurality of activity nodes, said message box for conveying textual information related to a performance metric associated with said activity node, the textual information provides a visual indication of what material is represented by said material flow path.

2. The method of claim 1, further comprising:
displaying a legend, said legend for explaining visual representations used to portray elements of said workflow process graphical user interface.

3. The method of claim 1, further comprising:
exhibiting a trend bar adjacent to one of said plurality of activity nodes, wherein said trend bar provides a summarized graphical performance metric of a work activity related to said activity node.

4. The method of claim 3, further comprising:
configuring said trend bar to display a detailed version of said summarized graphical performance metric in response to a user selection of said trend bar.

5. The method of claim 1, wherein said workflow path comprises:
an end-to-end overview of an entire workflow process configured for aggregate display on a single screen of a display device.

6. The method of claim 5, wherein said workflow path further comprises:
one or more selectable portions configured to display in an enlarged fashion in response to a user selection, said selectable portions configured to display more detailed process information when enlarged.

7. The method of claim 1, wherein said arranging a plurality of activity nodes along a workflow path comprises:
populating a first end of said workflow path with an initial work activity node, said initial work activity node representing an initial work activity in said process of performing work; and
populating a second end of said workflow path with a terminal work activity node, said terminal work activity node representing a final work activity in said process of performing work.

8. The method of claim 1, wherein said arranging a plurality of activity nodes along a workflow path, comprises:
utilizing a first visually distinct symbol to depict each of said plurality of activity nodes associated with a value added work activity; and
utilizing a second visually distinct symbol to depict each of said plurality of activity nodes associated with a non-value added work activity.

9. The method of claim 1, wherein said arranging a material flow path adjacent to said workflow path comprises:
denoting transformation points on said material flow path, said transformation points representing intermediate transformational stages in a transformation of a raw material to a finished product.

10. A system, comprising:
a memory arranged to store instructions for a workflow process graphical user interface; and
a processor to couple to said memory, said processor operative to execute said instructions stored by said memory to generate said workflow process graphical user interface arranged with a plurality of activity nodes along a workflow path with each activity node representing an individual work activity within a process of performing work, a material flow path adjacent to said workflow path and representative of a flow of different materials through said work activities associated with said plurality of activity nodes, and a resource allocation node adjacent to a portion of said material flow path and two or more activity nodes, wherein said resource allocation node comprises a resource utilization path extended between a start point of said resource allocation node and an end point of said resource allocation node, said resource allocation node representing a resource utilized in performing a plurality of work activities upon a material represented by said portion of said material flow path, wherein said plurality of work activities are associated with activity nodes encompassed by a lengthwise span of said resource utilization path and said start and end points and wherein a first visual indicator is used to denote the start and end points of a resource allocation node and a second visual indicator is used to denote the start and end points of a bottlenecked source, said processor further operative to display a message box near one of said plurality of activity nodes, said message box for conveying textual information related to a performance metric associated with said activity node.

11. The system of claim 10, said workflow process graphical user interface comprising a legend, said legend for explaining visual representations used to portray elements of said workflow process graphical user interface.

12. The system of claim 10, said workflow process graphical user interface comprising a trend bar adjacent to one of said plurality of activity nodes, wherein said trend bar provides a summarized graphical performance metric of a work activity related to said activity node.

13. The system of claim 10, said workflow process graphical user interface comprising an end-to-end overview of an entire workflow process configured for aggregate display on a single screen of a display device.

14. The system of claim 10, said workflow process graphical user interface comprising one or more selectable portions configured to display in an enlarged fashion in response to a user selection, said selectable portions configured to display more detailed process information when enlarged.

15. The system of claim 10, said workflow process graphical user interface arranged to populate a first end of said workflow path with an initial work activity node, said initial work activity node representing an initial work activity in said process of performing work, and populate a second end of said workflow path with a terminal work activity node, said terminal work activity node representing a final work activity in said process of performing work.

16. The system of claim 10, said workflow process graphical user interface arranged to denote transformation points on said material flow path, said transformation points representing intermediate transformational stages in a transformation of a raw material to a finished product.

* * * * *